United States Patent [19]

Endo et al.

[11] Patent Number: 5,396,148
[45] Date of Patent: *Mar. 7, 1995

[54] ULTRAFINE PARTICLES, THEIR PRODUCTION PROCESS AND THEIR USE

[75] Inventors: Yoshishige Endo, Tsuchiura; Takeshi Araya, Higashikurume; Masahiko Ono, Ibaraki; Takao Kawamura, Chiba; Hiromitsu Kawamura, Mobara, all of Japan

[73] Assignee: Hitachi, Ltd., Tokyo, Japan

[*] Notice: The portion of the term of this patent subsequent to Feb. 23, 2000 has been disclaimed.

[21] Appl. No.: 977,250

[22] Filed: Nov. 16, 1992

Related U.S. Application Data

[63] Continuation of Ser. No. 404,553, Sep. 8, 1989, Pat. No. 5,189,337.

[30] Foreign Application Priority Data

Sep. 9, 1988 [JP] Japan .................. 63-224658

[51] Int. Cl.$^6$ ............ H01J 29/88; H01B 01/08; B32B 18/00; C09K 03/16
[52] U.S. Cl. .................. 313/479; 313/478; 252/518; 75/233; 359/601; 428/325; 428/403; 106/286.4; 106/287.19; 106/287.34; 106/459; 348/834
[58] Field of Search ............ 313/424, 478, 479; 252/518; 428/325, 386, 387, 404, 403, 426, 429, 323; 358/252; 106/283.1, 286.4, 286.8, 287.19, 287.34, 459, 481; 75/233; 359/601; 220/2.1 A; 348/834, 835

[56] References Cited

U.S. PATENT DOCUMENTS

| | | | |
|---|---|---|---|
| 2,564,709 | 8/1951 | Mochel | 252/518 X |
| 3,484,284 | 12/1969 | Dates | 252/158 X |
| 3,861,978 | 1/1975 | Connole et al. | 106/286.4 X |
| 4,052,641 | 10/1977 | Dominick | 313/479 X |
| 4,619,704 | 10/1986 | Hashimoto et al. | 106/286.4 |
| 4,694,218 | 9/1987 | Chao | 313/478 |
| 4,723,091 | 2/1988 | Kawamura et al. | 313/478 |
| 4,917,452 | 4/1990 | Liebowitz | 350/96.14 X |
| 5,099,171 | 3/1992 | Daiku et al. | 313/478 X |

FOREIGN PATENT DOCUMENTS

0051101 3/1986 Japan .

Primary Examiner—Donald J. Yusko
Assistant Examiner—Ashok Patel
Attorney, Agent, or Firm—Antonelli, Terry, Stout & Kraus

[57] ABSTRACT

Ultrafine particles of a composite particulate substance composed of two or more types of inorganic oxides, forming a particle structure in which two or more types of inorganic oxides are mutually mixed or an inorganic oxide of one type is contained in an inorganic oxide of another type, and having an average particle diameter of not more than 0.1 μm, a process for the production of the ultrafine particles, use of the ultrafine particles as a thin film, particularly in an image display face plate and a cathode ray tube, and a process for using the ultrafine particles therefor.

9 Claims, 4 Drawing Sheets

15μm 0.1μm

ULTRAFINE PARTICLES, THEIR PRODUCTION PROCESS AND THEIR USE

This is a continuation of application Ser. No. 07/404,553, filed Sep. 8, 1989, now U.S. Pat. No. 5,189,337.

BACKGROUND OF THE INVENTION

1. Field of the Invention

This invention relates to ultrafine particles and their production process and use. In particular, it relates to ultrafine particles capable of functioning effectively as an anti-reflection film in a cathode ray tube, a process for the production thereof and use thereof.

2. Related Art

A technique of mixing two types of ultrafine particles having different functions and using the mixture for a specific purpose has hitherto been known. In this case, it is required to meet two different functions simultaneously. The reality is, however, that since both of the functions are diluted, obtained products have little practical utility.

On the other hand, a cathode ray tube has required both formation of an electrically conductive film for prevention of a charge on a glass surface thereof and a device for prevention of reflection.

Meanwhile, it is known that the front panel surface (image display face plate) of a cathode ray tube such as a Braun tube, etc., takes a charge. The reason therefor is that, while a thin and uniform aluminum film 11 is deposited on a phosphor 10 applied to an inner surface 9 of a Braun tube 7 as shown in FIG. 3, if a high voltage is applied to the aluminum film 11, electrostatic induction causes a phenomenon of charge generation on a front panel 12 of the Braun tube when it is applied and cut off.

Japanese Patent Kokai (Laid-Open) No. 51101/1986 discloses a process for forming an electrically conductive anti-reflection film to prevent not only charge generation but also reflection on the surface of such a display tube. In this case, firstly, an electrically conductive film is formed on a glass substrate by a physical gas phase process or chemical gas phase process such as a vacuum deposition process, sputtering process, etc., and then an anti-reflection film is formed thereon.

As stated above, however, mixed ultrafine particles have a drawback in that the functions of the ultrafine particle materials are diluted. Meanwhile, formation of a laminate of two films of ultrafine particles has problems on producibility, costs and film strength.

In particular, the above prior art uses a technique of forming a two-layered structure in which an electrically conductive film and an anti-reflection film are formed, respectively, and it has posed problems in manufacture and costs. Further, in case of formation of a film on the surface of a display tube such as a Braun tube, etc., in which a film firing temperature is limited to a low temperature, there have been problems in film strength and reflectivity.

SUMMARY OF THE INVENTION

The first aspect of this invention is directed to ultrafine particles which are composed of material components having different functions and which retain the functions of the components without degrading the functions. The second aspect of this invention relates to a process for the production of ultrafine particles composed of oxides having electrical conductivity and anti-reflective function. The third aspect of this invention is directed to a thin film which is formed by coating the above ultrafine particles on a surface of a display tube (or face plate) such as a Braun tube, etc., and which has efficient electrical conductivity and anti-reflective function.

BRIEF DESCRIPTION OF THE INVENTION

FIGS. 1, 6 and 7 respectively show typical cross sectional views of embodiments of ultrafine particles of this invention.

Figure 1:
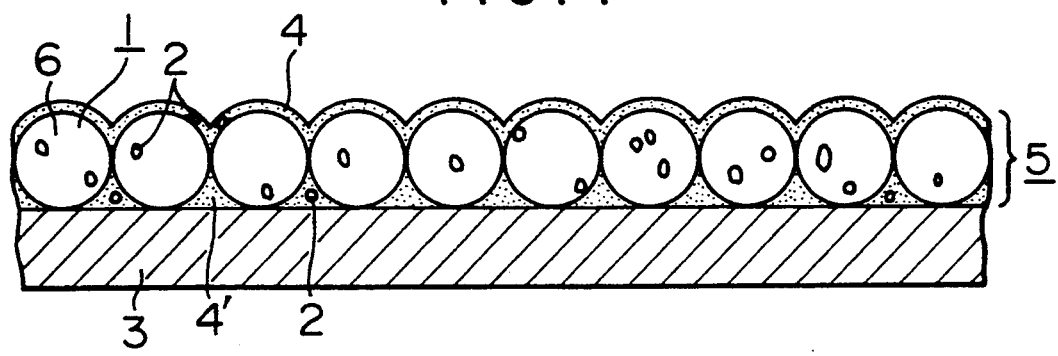

FIGS. 1–4 and 6–8 include the following reference numerals which represent the following noted elements:

1 ... ultrafine particle, 2 ... electrically conductive component, 3 ... glass substrate, 4 ... $SiO_2$ thin film, 4' ... $SiO_2$ filled portion, 5 ... ultrafine particle thin film, 6 ... anti-reflection functioning portion, 7 ... Braun tube, 10 ... phosphor, 11 ... aluminum film, 12 ... front panel, 13 ... anti-reflection film, 14 ... tungsten electrode, 15 ... material for mixed ultrafine particles, 16 ... water-cooled copper crucible, 17 ... arc, 18 ... shielding gas nozzle, 19 ... discharge power source, 20 ... shielding gas introduction port, 21 ... atmospheric gas introduction port, 22 ... ultrafine particle generation chamber, 23 ... ultrafine particle collection portion, 24 ... circulation pump, 25 ... exhaustion pump.

DETAILED DESCRIPTION OF PREFERRED EMBODIMENTS

In this invention, the ultrafine particles represent a composite particulate substance composed of two or more types of inorganic oxides, forming a particle structure in which two or more types of inorganic oxides are mutually mixed or an inorganic oxide of one type is contained in an inorganic oxide of another type, and having an average particle diameter of not more than 0.1 μm. Preferred examples are particles in which their particle distribution has a maximum peak in the vicinity of their average particle diameter, the amount in the maximum peak accounts for not less than 50% based on the total amount, the maximum particle diameter is about two times as large as the average particle diameter and the minimum particle diameter is about ½ thereof.

Figure 7:
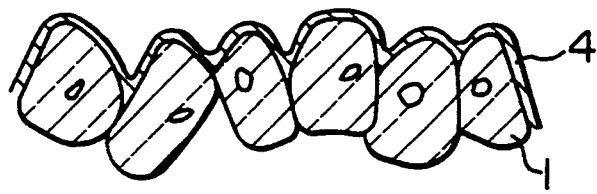

The above ultrafine particles may be not only spherical but also incompletely spherical as shown in FIG. 7. However, if the particle diameter of the ultrafine particles is too small, the outermost surface of a film formed therefrom is too smooth and there is a risk that insufficient effect on prevention of reflection can be obtained. The preferable average diameter is hence not less than 0.05 μm. If the particle diameter is, oppositely, too large, a diffusion effect is too high, and hence a resolution is not only deteriorated but also a film strength is poor. For this reason, the desired particle diameter is not more than 0.1 μm.

The above inorganic oxides of two or more types are composed usually of an electrically conductive component and an anti-reflection functioning component. The proportions of the electrically conductive component and anti-reflection functioning component vary to some extent depending upon materials of the components and production conditions. It is, however, preferable that the proportion of the electrically conductive component is not less than 10% based on the total weight of ultrafine particles. In addition, if this proportion exceeds 50%, there is a risk that the anti-reflective function is deteriorated, and it has to be adjusted to not more than 50%. In the interest of explanation, in some cases, the electrically conductive component may be referred to as a minor component, and the anti-reflection functioning component as a major component.

It is not always clear what form is taken by each of the components of ultrafine particles of this invention to form particulate substance depending upon its type, performance, etc. In some cases, the minor component in a particulate form is contained in the major component, in which case it is preferable that a particulate substance formed of the minor component has an average particle diameter of 0.01 to 0.05 μm.

The typical example of the anti-reflection functioning component is $SiO_2$ (silicon oxide). On the other hand, the typical examples of the electrically conductive component include $SnO_2$ (tin oxide), $In_2O_3$ (indium oxide), $Sb_2O_3$ (antimony oxide), etc. In addition, these electrically conductive components may be used in combination.

The combination of the two components is not limited to a combination of the above anti-reflection functioning component and the above electrically conductive component. The point is that produced ultrafine particles are to satisfy the two functions. When the minor component is contained in the major component as mentioned above, a minimum fine particle of the minor component exists as if it were an island in the sea formed of the outer shell of an ultrafine particle composed of the major component.

Further, when not more than 10% by weight of fine particles having an average particle diameter of 0.01 to 0.05 μm and either composed of an electrically conductive component or composed of an electrically conductive component and anti-reflection functioning component are incorporated into the ultrafine particles of this invention, it is also possible to obtain the same effect as is obtained by using the ultrafine particles of this invention alone.

The ultrafine particles of this invention can be produced by using an apparatus which is usually used to produce ultrafine particles from a metal component. Examples of such an apparatus include apparatus in which both an anti-reflection functioning component and an electrically conductive component are evaporated by using arc, plasma, laser, electron beam, gas, etc., or the like as a heat source, and quenched to produce ultrafine particles having a form in which these material components are mutually mixed. More specifically, it is possible to cite an apparatus typically shown in FIG. 8, e.g. a laser-applied apparatus for generation of ultrafine particles, described in U.S. Pat. No. 4,619,691, an arc-applied apparatus for generation of ultrafine particles, described in U.S. Pat. Nos. 4,610,718 and 4,732,369.

Figure 8:
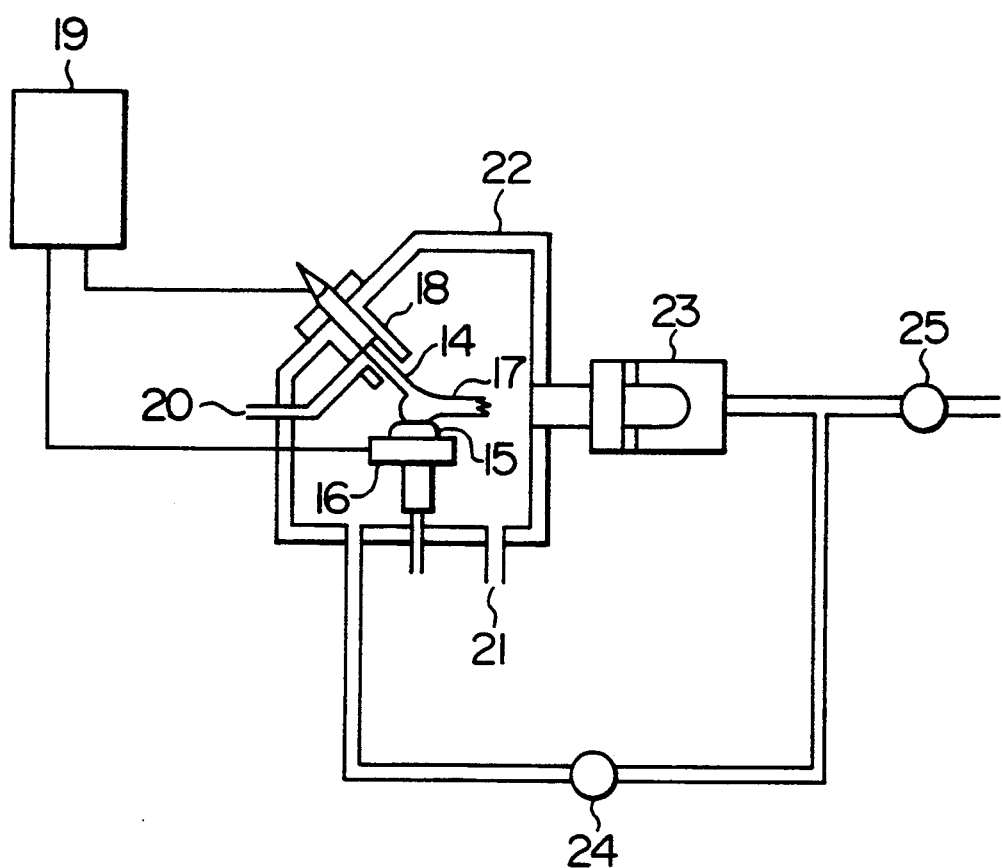
FIG. 8 shows an arrangement of an apparatus for the production of ultrafine particles of this invention.

In FIG. 8, 14 indicates a tungsten electrode as an electrode for discharge, 15 indicates a material for mixed ultrafine particles, 16 indicates a water-cooled copper crucible, 17 indicates an arc, 18 indicates a shielding gas nozzle, 19 indicates a discharge power source, 20 indicates a shielding gas introduction port, 21 indicates an atmospheric gas introduction port, 22 indicates an ultrafine particle generation chamber, 23 indicates an ultrafine particle collection portion, 24 indicates a circulation pump, and 25 indicates an exhaustion pump.

In the above constitution, at first, the system is vacuum-exhausted by the exhaustion pump 25. Thereafter, oxygen gas or a mixture of said gas with an inert gas such as argon gas is introduced until it shows an appropriate pressure, e.g. about 0.1 MPa, and circulated in the system by the circulation pump. Then, argon gas is introduced into the system through the shielding gas introduction port 20, and a predetermined amount of the above gas is introduced through the atmospheric gas introduction port 21. At the same time, the exhaustion pump is worked to exhaust gas in the same amount as that of the introduced gas. In this state, an electric current is supplied from the discharge power source 19 to generate the arc 17 between the tungsten electrode 14 and the material 15 for ultrafine particles, which is a mixture of at least two materials, whereby the material 15 for ultrafine particles is evaporated by an arc heat and reacts with activated oxygen gas to form oxides-mixed ultrafine particles, and the ultrafine particles are delivered to the collection portion 23 together with a circulation gas and collected. In the above procedure, if a mixture gas with an inert gas is used, the tungsten electrode 14 is shielded with the inert gas, so that the consumption of the tungsten electrode is very small and tungsten as an impurity is rarely included in the produced ultrafine particles. Further, since new oxygen gas or mixture of said gas with an inert gas is always introduced into the system, it is possible to prevent oxidation of the formed ultrafine particles from decreasing the oxygen concentration in the system.

Examples of the inert gas include helium gas, argon gas, etc.

The above apparatus can be operated according to an ordinary method, and the use of these apparatus makes it possible to produce ultrafine particles of this invention without any difficulty.

By using a mixture of at least two materials for ultrafine particles, it is possible to form mixed ultrafine particles of oxides of the materials. In this case, by mixing materials having a nearly identical evaporation rate, it is possible to form ultrafine particles having a nearly identical composition with the composition ratio of the materials.

Further, ultrafine particles of like oxides can be formed from either metals or metal oxides as a material. In this case, if mixed metal materials easily combine with each other, compounded ultrafine particles tend to be formed, and if they are difficult to combine with each other, ultrafine particles of individual metal oxides tend to be formed. In general, an oxide having electrical conductivity and an oxide having an anti-reflective function do not combine with each other, and hence ultrafine particles composed of both oxides are formed.

The thin film of this invention is composed mainly of the above ultrafine particles. In addition, if a material component for the above ultrafine particles represent minimum size ultrafine particles (having an average particle diameter of 0.01 to 0.05 μm), a mixture of the above ultrafine particles of this invention with the minimum size ultrafine particles also comes within the scope of this invention.

One layer is sufficient for the thin film. A thin film of two layers may be formed as required. Preferably, the thin layer has a thickness of 0.1 to 0.2 μm.

The optimum ratio of the electrically conductive component and the anti-reflection functioning component in the thin film is the same as the aforementioned optimum ratio of these components in the ultrafine particles. The formation of a thin film from the mixed ultrafine particles of the electrically conductive component and the anti-reflection functioning component can be carried out by coating a suitable amount of the ultrafine particles on a substrate, and to coat one layer is ideal operationwise, economywise, etc.

The process for the formation of a thin layer comprises dispersing the ultrafine particles of this invention or the ultrafine particles and material ultrafine particles in an alcohol in which $Si(OR)_4$ (wherein R denotes an alkyl group) is dissolved, coating the solution on a light-transmissible, image display panel, and then calcining (firing) the coated surface to decompose the $Si(OR)_4$ and form an ultrafine particle film covered with $SiO_2$.

R of the above $Si(OR)_4$ preferably represents an alkyl group having 1 to 5 carbon atoms. Concerning the above alcohol in which $Si(OR)_4$ is dissolved, the viscosity of an alcohol solution becomes higher with the increasing number of carbon atoms, and the alcohol is therefore suitably selected by considering operationability such that the operationability is not hampered by an increased viscosity.

In general, examples of the usable alcohol are those having 1 to 5 carbon atoms.

Further, a hygroscopic salt of a metal of group II or III of the periodic table may be incorporated into the above thin film in order to impart it with an antistatic effect. Typical examples thereof include aluminum hydrochloride, nitrate, sulfate and carboxylate.

Further, to promote the hydrolysis of $Si(OR)_4$, the solution for a thin film coating may be prepared by adding water and a mineral acid as a catalyst, e.g. nitric acid.

The coating of the above alcohol solution on a substrate is carried out practically by using a spinning method, dipping method, spray method or a coating method combining these methods and at the same time by subjecting the coated surface to heat treatment at 50° to 200° C.

Examples of the device in which the thin film of this invention exhibits its highest effects include an image display face plate or anti-reflection film formed on a light-transmissible substrate such as a thin glass substrate and a cathode ray tube into which this image display face plate is incorporated.

The amount of ultrafine particles of this invention to be set into a substrate is preferably 0.01 to 1 mg/cm$^2$, and more preferably 0.1 to 0.3 mg/cm$^2$.

In addition, in case of use in the above devices, it is preferable that the electrically conductive component is transparent. That is because an optical path is not to be blocked.

Further, the thin film of this invention will be discussed in detail by reference to the drawings.

Figure 2:
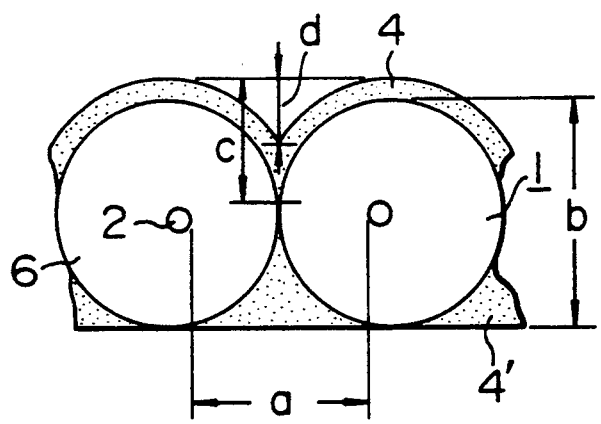
FIG. 2 shows a partially enlarged view of FIG. 1.
Figure 3:
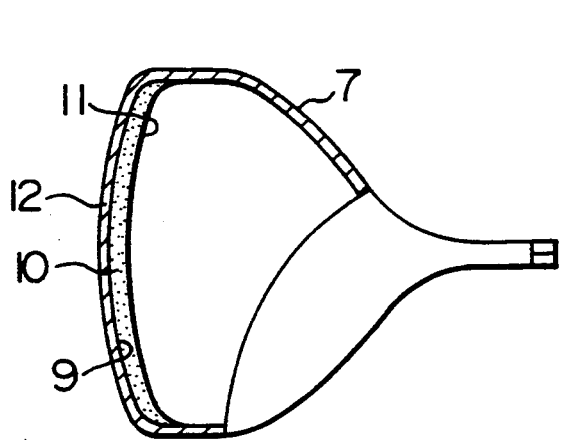
FIG. 3 shows a general cross sectional view of an embodiment in which this invention is applied to a cathode ray tube.
Figure 4:
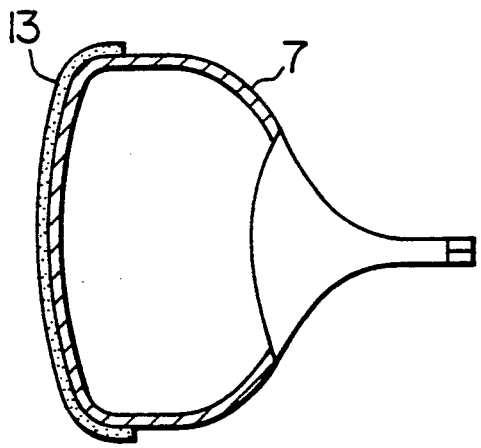
FIG. 4 shows a cross sectional view of a cathode ray tube coated with ultrafine particles of this invention.

FIG. 1 shows a cross sectional view of an anti-reflection film formed on a glass substrate, and FIG. 2 shows a partially enlarged view thereof.

In the embodiment of FIGS. 1 and 2, one-layered ultrafine particle thin film 5 is formed on a glass substrate 3. The ultrafine particle thin film is composed mainly of ultrafine particles 1, in which each of the ultrafine particles 1 is a mixture of an electrically conductive component 2 and an anti-reflection functioning component 6. The electrically conductive component represents what is called minimum ultrafine particles, and it may also be present outside the ultrafine particle 1. Although these ultrafine particles are covered with an $SiO_2$ thin film 4 in this embodiment, this invention shall not be limited thereto, that is, the ultrafine particles may be present uncovered without being coated with an $SiO_2$ coating film. An $SiO_2$ filled portion 4' is formed in a space between the ultrafine particles and the glass substrate 3. The $SiO_2$ thin film 4 and the $SiO_2$ filled portion 4' are products from the firing and decomposition of $Si(OR)_4$.

In addition, the proportion of the electrically conductive component in the ultrafine particles in the formed film in the above case is not less than 10% and not more than 50% by way of weight %, and the proportion is calculated by excluding the weights of the $SiO_2$ thin film 4 and $SiO_2$ filled portion 4'.

The inter-particle distance among the ultrafine particles is required to be that which holds the distance between the electrically conductive components contained in mutually adjacent ultrafine particles such that a so-called tunnel effect is exhibited. Such an inter-particle distance is preferably not more than 0.05 μm.

Further, since the average diameter of the ultrafine particles is not more than 0.1 μm, the acceptable thickness of the thin film is 0.1 μm to 0.2 μm, and in this case, the depth of an inter-particle valley in the thin film is usually 0.05 μm to 0.2 μm (when it is covered with an $SiO_2$ thin film, the depth of the valley is 0.05 μm to 0.2 μm). These relationships are shown in FIG. 2, in which "a" denotes a distance between electrically conductive components, "b" denotes a particle diameter of an ultrafine particle, "c" denotes a depth of a valley, and "d" denotes a depth of a final valley when a covering of an $SiO_2$ thin film exists.

Furthermore, $SiO_2$ formed by decomposition of $Si(OR)_4$ penetrates a space between the ultrafine particles and the substrate, and hence works as an adhesive.

The following will explain the function of each component of the ultrafine particles.

The formation of a thin film by using the ultrafine particles of this invention makes it possible to maintain not only the function of the major component but also the function of the minor component as functions of the ultrafine particles of this invention. In this case, concerning the function of a component formed of the minor component and included, in a form of a minimum ultrafine particle, in the ultrafine particle, the distance which is present between the minimum ultrafine particles existing in adjacent ultrafine particles is a very short one, and does not exceed the size of the ultrafine particle, and a tunnel effect is consequently exhibited in terms of electrical conductivity.

In this case, the major component achieves a low reflection function mainly on the basis of an effect of its surface roughness which is necessarily formed due to its particle size. The electrically conductive component exhibits electrical conductivity on the basis of a tunnel effect. The film strength of the present invention is therefore improved more due to a decrease in peeled portions (potential) than a laminate of the individual functional components. And unlike ultrafine particles obtained by separately preparing each of the components having individual functions and mixing these components, in case of the present ultrafine particles, a tunnel effect can be utilized, and hence the functions of these components can be maintained and improved.

The following will explain why the reflectivity can be decreased in a glass face plate on which the above anti-reflection film is formed.

Figure 6:
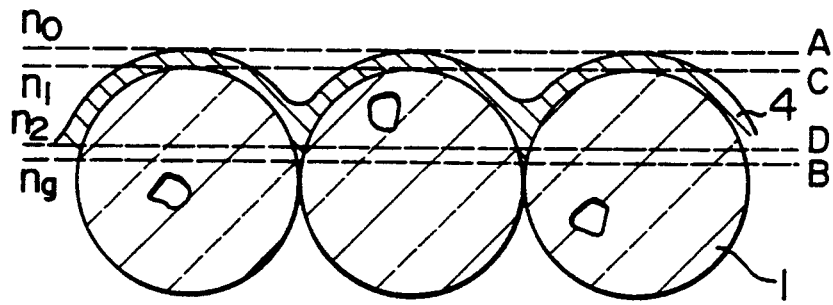

FIG. 6 shows a cross sectional view of a reflection film, in which the refractive index in a position indicated as A is a refractive index of air $n_0$, and its value is about 1. On the other hand, a position indicated as B is in a state that ultrafine particles 1 (composed mainly of $SiO_2$) are filled, and the refractive index in the position is nearly identical with the refractive index of glass (composed mainly of $SiO_2$), $n_g = 1.48$. In the concavo-convex portion spaced between these A and B, when a volume percent is supposed, i.e. when it is supposed that very small and thin plates are taken in parallel with planes A and B, the refractive index continuously changes in proportion to a volume of an $SiO_2$ portion based on the total volume of the plate. Suppose that the refractive index in a position C located a little inward from A is $n_1$ and that the refractive index in a position D located a little outward from B is $n_2$. Then, the condition for minimizing the reflectivity R on the surface of a glass plate on which this anti-reflection film is formed is:

$$R = \frac{(n_1 n_g - n_2 n_0)^2}{(n_1 n_g + n_2 n_0)^2} = 0$$

From the above, when the condition of $n_g = n_2/n_1$ is satisfied, a non-reflection performance is obtained.

In this case, the value of $n_2/n_1$ is determined depending upon a concavo-convex form. It is considered that a concavo-convex portion which approximately satisfies the above formula can be formed and a reflectivity of as low as not more than 1% can be obtained by applying an ultrafine particles-added alcohol solution of $Si(OR)_4$ and firing the coating as previously mentioned.

It is further considered that it is because an $SiO_2$ film formed by the following hydrolysis of $Si(OR)_4$ is present and works as a protection film that the anti-reflection film of this embodiment maintains high mechanical strength.

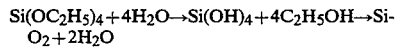

$$Si(OC_2H_5)_4 + 4H_2O \rightarrow Si(OH)_4 + 4C_2H_5OH \rightarrow SiO_2 + 2H_2O$$

Further, since a fine concavo-covex portion of the ultrafine particles of this invention is formed on a display face plate regularly and uniformly, a good effect on prevention of reflection can be obtained, and at the same time degradation of a resolution due to a concavo-convex portion formed more than needed does not occur.

EXAMPLE 1 (Preparation of ultrafine particles)

Figure 9:
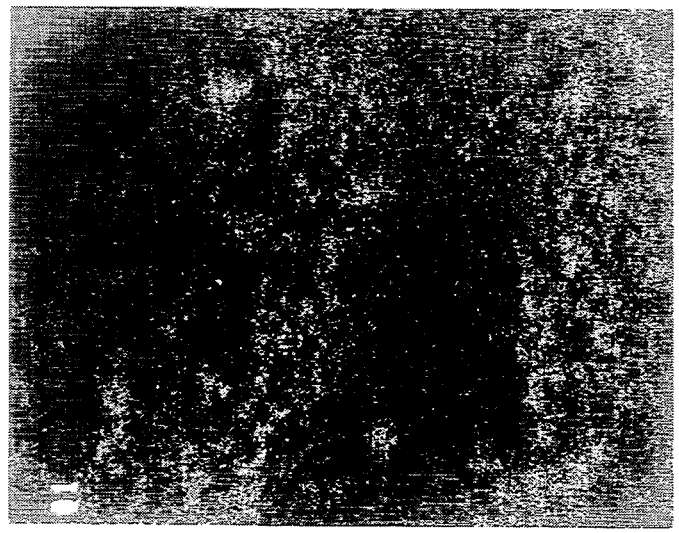
FIGS. 9 and 10 are respectively photomicrographs showing particle structures of oxides-mixed ultrafine particles produced in Examples of this invention.
Figure 10:
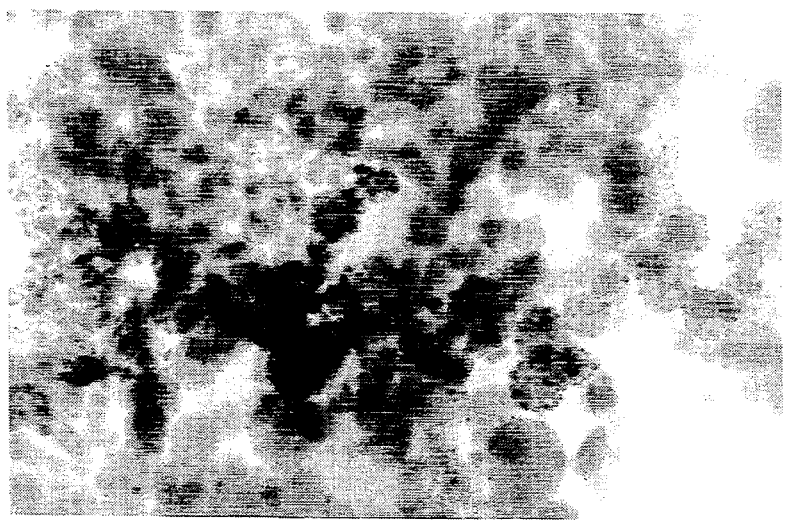

Oxides-mixed ultrafine particles were formed from a compressed powder, as a material for mixed ultrafine particles, of 80 wt. % of Si and 20 wt. % of a mixture consisting of 90 wt. % of $SnO_2$ and 10 wt. % of Sb by using an apparatus for production of ultrafine particles typically shown in FIG. 8 under an arc condition of 150 A-30 V and by using an argon and 30% oxygen gas as a gas for system atmosphere, 3 l/min of argon as a shielding gas and 20 l/min of an argon and 30% oxygen gas as an atmosphere introduction gas. The formed ultrafine particles were those in which oxides of $SiO_2 + SnO_2 + Sb_2O_3$ were mixed, and the composition ratio thereof was 40:9:1 which was nearly identical with the starting material ratio. Their specific surface area was 60 to 70 $m^2/g$, and the rate of their formation was 15 to 20 g/hour, which was about six times as large as that in case of forming $SiO_2$ ultrafine particles from Si as a material. FIG. 9 shows a result of measurement of an Sn distribution in the formed oxides-mixed ultrafine particles, obtained by using a scanning electron microscope, in which it is seen that Sn is uniformly dispersed. FIG. 10 shows a result of observation using a transmission-type electron microscope, which indicates a state that $SnO_2 + Sb_2O_3$ ultrafine particles are finely dispersed in and out of an amorphous $SiO_2$ ultrafine particle.

As mentioned above, according to this Example, ultrafine particles in a form that ultrafine particles of at least two oxides are nearly uniformly mixed can be formed by using an arc heat source.

Further, oxides-mixed ultrafine particles can be obtained by adding the above mixed powder to $Ar-O_2$ induction plasma or arc plasma as a heat source thereby to form oxides-mixed ultrafine particles.

EXAMPLES 2–6 (Formation of a thin film)

Tetraethoxysilane [$Si(OC_2H_5)_4$] was dissolved in ethanol, and water ($H_2O$) for hydrolysis and nitric acid ($HNO_3$) as a catalyst were further added to prepare a solution. 1 g of ultrafine particles 1 (nearly spherical in particle form) obtained in the same way as in Example 1 were added to the above alcohol solution. At this time, a suitable amount of acetyl acetone as a dispersing medium was added to disperse the particles sufficiently.

Before the above addition of the ultrafine particles 1 to the alcohol solution, various additives in prescribed amounts as shown in Table 1 were added to the alcohol solution.

A formulation liquid shown in Table 1 was dropped on a glass face plate and coated thereon uniformly with a spinner.

Figure 5:
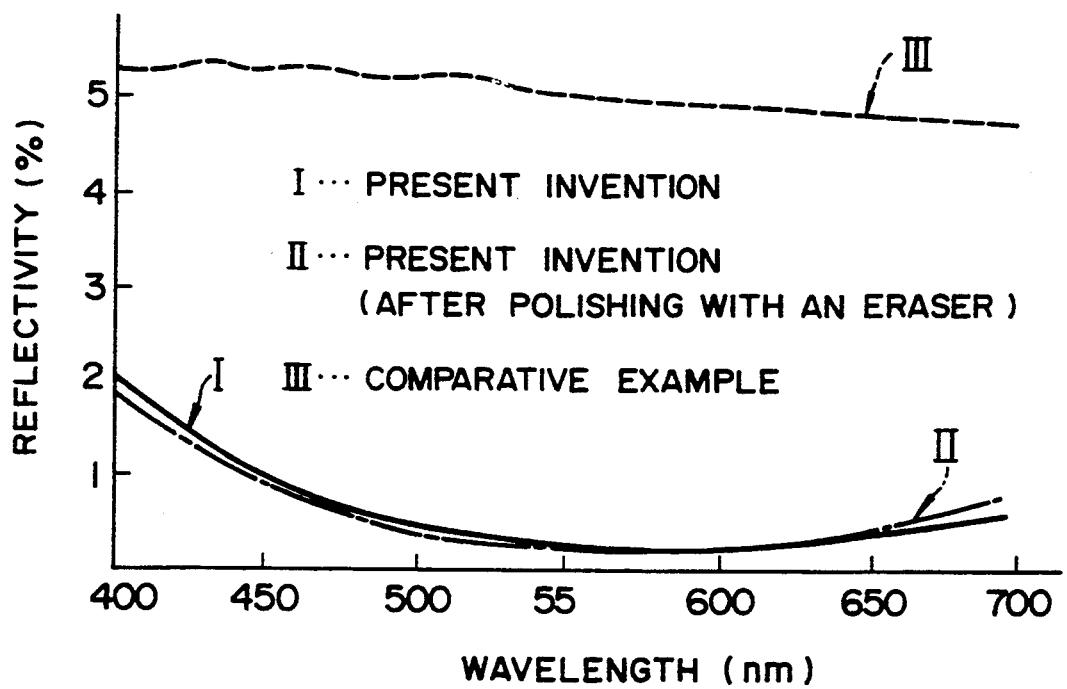
FIG. 5 shows the characteristic of reflectivity in case of application of ultrafine particles of this invention to an anti-reflection film.

The coating was fired in air at 150° C. for about 30 minutes to decompose tetraethoxysilane [$Si(OC_2H_5)_4$]. The ultrafine particles added to the alcohol solution were firmly fixed and set with a continuous uniform thin film of $SiO_2$ formed by decomposition, whereby a concavo-convex portion was formed on the glass face plate. Microscopic observation of the cross section of the anti-reflection film formed as above shows formation of an anti-reflection film 13 having a uniform concavo-convex portion having a depth of 1,000 Å ± 200 Å and a pitch of 500 Å in the outermost surface, as is shown in FIG. 5, a partially enlarged view of FIG. 4. In addition, the constitution of the anti-reflection film 13 is the same as that shown in FIGS. 1 and 2, where 4 and 4' represent an $SiO_2$ portion formed by composition of tetraethoxysilane, and the $SiO_2$ portion contains an additive which is antistatic component.

The solution may be applied by not only the above spinning method but also a dipping method, coating method, spray method or a combination of these. The suitable firing temperature after the coating formation is about 50° C. to about 200° C.

TABLE I

| Item | | | Example 2 | Example 3 | Example 4 | Example 5 | Example 6 |
|---|---|---|---|---|---|---|---|
| Formulation solution (g) | Alcohol solution of Si(OC$_2$H$_5$) in ethanol | | 50 | 50 | 50 | 50 | 50 |
| | Additives | Al(NO$_3$)$_3$·9H$_2$O Nitrate | 0.5 | 0.5 | — | — | — |
| | | AlCl$_3$ Hydrochloride | — | 0.2 | — | — | — |
| | | Al$_2$O(CH$_3$COO)$_4$·4H$_2$O Carboxylate | — | — | 0.7 | — | — |
| | Dispersing medium | Acetyl acetone | 50 | 50 | 50 | 50 | 50 |
| | Ultrafine particles | | 1.0 | 1.0 | 1.0 | 1.0 | 1.0 |
| Characteristic | Reflectivity % 5° specular reflectivity 550 nm | | 0.5> | 0.5> | 0.5> | 0.5> | 0.5> |
| | Surface resistance (Ω) | | 1 × 10$^9$> | 1 × 10$^8$> | 1 × 10$^9$> | 1 × 10$^7$> | 1 × 10$^{12}$ |
| | Strength (increase in reflectivity after polishing 50 times with an eraser) | | +0.1> | +0.2> | +0.1> | +0.2> | +0.2> |

A beam having a wavelength of 550 nm was directed into a glass face plate, on which the above anti-reflection film was formed, at an incident angle of 5°, and the reflectivity thereof was measured to show less than 0.5% as shown in Table 1, and when the wavelength was in the range of from 450 to 650 nm, the reflectivity was not more than 1% as shown by a curve I in FIG. 5. This value sufficiently meets requirements for VDT (visual display terminal).

When the surface of the glass face plate on which the anti-reflection film was formed was polished with an eraser (Lion 50—50, trade name, made by Lion Jimuki K.K.) 50 times strongly and uniformly under a pressure of 1 kgf, the reflectivity shifted toward the short wavelength side by only about 0.1% to 0.2% as shown in the section of strength in Table 1 and by a curve II in FIG. 5, and there was no problem on its quality. For comparison, the same test was carried out on a glass face plate on which a concavo-convex portion was formed by conventional etching. As a result, the reflectivity increased by 2% when the face plate was polished with an eraser once, and the reflectivity became the same as that shown by a curve III in FIG. 5 when the face plate was polished five times.

Further, it is considered that it is because various antistatic components in the solution work effectively and do not have much influence on the anti-reflection performance and film strength that low surface resistance can be obtained as shown in Table 1.

EXAMPLE 7 (Formation of a thin film)

Oxide ultrafine particles (0.2 g) obtained in Example 1 were dispersed in 1 g of nitric acid, and 5 g of an alcohol solution of silicic acid ester, 5 g of acetyl acetone and 0.1 g of dicarboxylic acid were added, stirred and dispersed. The resultant solution was dropped on glass substrate and spin-coated at 600 rpm maintained for 1 minute, and the coating was fired at 160° C. for 30 minutes. The formed film had a 5° specular reflectivity, in the visual region of from 400 to 700 nm, of 0.06% and a surface resistance of 0.5 to 1×10$^7$ Ω/□.

SiO$_2$ ultrafine particles and SnO$_2$+10 wt. % Sb$_2$O$_3$ ultrafine particles were separately formed and mixed to prepare a material, and a film was formed in the same way as in the above Example. The film had a surface resistance of several tens G Ω/□.

According to this invention, a mixture of material components having different functions can be obtained as ultrafine particles without deteriorating the functions of the material components.

The process of this invention has an effect that uniformly dispersed, oxides-mixed ultrafine particles can be obtained from a mixed material of at least two components by using an arc heat source, etc. Further, there is an effect that an electrically conductive anti-reflection film can be produced easily and simply and at low costs by using the ultrafine particles.

What is claimed is:

1. A thin film which is composed of ultrafine particles of a composite particulate substance composed of at least two types of inorganic oxides, forming a particulate structure comprising at least an electrically conductive inorganic oxide selected from the group consisting of SnO$_2$, In$_2$O$_3$ and Sb$_2$O$_3$, and an anti-reflective inorganic oxide comprising SiO$_2$ and wherein the electrically conductive and the anti-reflective inorganic oxides are mutually mixed or wherein the electrically conductive inorganic oxide is contained in the anti-reflective inorganic oxide, the particulate structure having an average particle diameter of not more than 0.1 μm and a particle size distribution having the following characteristics that:

a maximum peak is existent in the vicinity of the average particle diameter of the ultrafine particles, an amount of ultrafine particles having a particle diameter in the maximum peak region accounts for not less than 50% based on the total amount, a maximum particle diameter is about two times as large a the average particle diameter, and a minimum particle diameter is about ½ thereof, and a thickness of said film is 0.1 to 0.2 μm.

2. A thin film according to claim 1, wherein valleys formed between adjacent ultrafine particles have a depth of 0.05 to 0.2 μm.

3. A thin film according to claim 1, wherein said composite particulate substance is composed of more than two types of inorganic oxides.

4. An image display face plate having a surface on which a thin film is formed, said thin film being composed of at least two types of inorganic oxides, forming a particulate structure comprising at least an electrically conductive inorganic oxide selected from the group consisting of SnO$_2$, In$_2$O$_3$ and Sb$_2$O$_3$, and an anti-reflective inorganic oxide comprising SiO$_2$ and wherein the electrically conductive and the anti-reflective inorganic oxides are mutually mixed or wherein the electrically conductive inorganic oxide is contained in the anti-reflective inorganic oxide, the particulate structure having an average particle diameter of not more than 0.1 μm and a particle size distribution having the following characteristics that:

a maximum peak is existent in the vicinity of the average particle diameter of the ultrafine particles, an amount of ultrafine particles having a particle diameter in the maximum peak region accounts for not less than 50% based on the total amount, a maximum particle diameter is about two times as large a the average particle diameter, and a minimum particle diameter is about ½ thereof, and a thickness of said film is 0.1 to 0.2 μm.

5. An image display face plate according to claim 4, wherein valleys formed between adjacent ultrafine particles have a depth of 0.05 to 0.2 μm.

6. A cathode ray tube having a surface on which a thin film is formed, said thin film being composed of at least two types of inorganic oxides, forming a particulate structure comprising at least an electrically conductive inorganic oxide selected from the group consisting of $SnO_2$, $In_2O_3$ and $Sb_2O_3$, and an anti-reflective inorganic oxide comprising $SiO_2$ and wherein the electrically conductive and the anti-reflective inorganic oxides are mutually mixed or wherein the electrically conductive inorganic oxide is contained in the anti-reflective inorganic oxide, the particulate structure having an average particle diameter of not more than 0.1 μm and a particle size distribution having the following characteristics that:

a maximum peak is existent in the vicinity of the average particle diameter of the ultrafine particles, an amount of ultrafine particles having a particle diameter in the maximum peak region accounts for not less than 50% based on the total amount, a maximum particle diameter is about two times as large a the average particle diameter, and a minimum particle diameter is about ½ thereof, and a thickness of said film is 0.1 to 0.2 μm.

7. A cathode ray tube having according to claim 6, wherein valleys formed between adjacent ultrafine particles have a depth of 0.05 to 0.2 μm.

8. Ultrafine particles of a composite particulate substance composed of at least two types of particulate substances forming a particulate structure in which at least one electrically conductive inorganic oxide selected from the group consisting of $SnO_2$, $In_2O_3$ and $Sb_2O_3$ is contained in an anti-reflective inorganic oxide comprising $SiO_2$: said particulate structure having an average particle diameter of not more than 0.1 μm.

9. Ultrafine particles according to claim 8, wherein said composite particulate substance is composed of more than two types of inorganic oxides.

* * * * *